United States Patent [19]

Brown

[11] Patent Number: 5,169,891
[45] Date of Patent: Dec. 8, 1992

[54] COATING COMPOSITIONS COMPRISING A BLEND OF AN ETHYLENE VINYL ACETATE POLYMER WITH A FATTY ACID AND EMULSIONS

[76] Inventor: Nicholas Brown, Durgates Industrial Estate, Wadhurst, East Sussex TN5 6DF, Great Britain

[21] Appl. No.: 678,956

[22] PCT Filed: Oct. 20, 1989

[86] PCT No.: PCT/GB89/01253

§ 371 Date: Apr. 19, 1991

§ 102(e) Date: Apr. 19, 1991

[87] PCT Pub. No.: WO90/04616

PCT Pub. Date: May 3, 1990

[30] Foreign Application Priority Data

Oct. 21, 1988 [GB] United Kingdom ............... 8824714
Oct. 21, 1988 [GB] United Kingdom ............... 8824716

[51] Int. Cl.⁵ ............................................. C08K 5/09
[52] U.S. Cl. ..................................... 524/284; 524/321; 524/322; 524/398; 524/487; 524/563
[58] Field of Search ............. 524/318, 487, 398, 563, 524/322, 321, 284

[56] References Cited

U.S. PATENT DOCUMENTS 3,493,537  2/1970  Salyer et al. ................... 524/322
4,681,910  7/1987  Crockatt et al. ................ 524/487
4,975,481  12/1990  Tamm et al. ................... 524/563

FOREIGN PATENT DOCUMENTS 252697  12/1960  Australia.
61-200141  9/1986  Japan.
2-208370  8/1990  Japan.

OTHER PUBLICATIONS

Chemical Abstract 92586u, vol. 81, No. 16, Oct. 1974.

*Primary Examiner*—Paul R. Michl
*Assistant Examiner*—Tae H. Yoon
*Attorney, Agent, or Firm*—Thomas J. Dodd

[57] ABSTRACT

Coating compositions based on ethylene vinyl acetate polymers have improved compatibility with solvents (especially with aliphatic hydrocarbon solvents) hydrocarbon oils, and mineral waxes by blending the EVA with a fatty acid and heating at or above the melting point of the EVA. Furthermore the resultant blends are much more easily emulsified in the presence of cations than blends which have not been processed with the fatty acids. Typically the starting material for the improved product of this invention is a composition comprising a blend of an EVA polymer and a fatty acid which is miscible in all proportions with mineral spirits at 25° C. or forms a solution at a level 5% of fatty acid in mineral spirits, such as coconut or palm fatty acids. Also disclosed is that the addition of a salt of an amine acetic acid in sufficient quantity to an acidified salt of zirconium (for example EDTA and zirconium acetate) forms a novel emulsifying agent, and this emulsifying system is used advantageously with the described EVA/fatty acid blends.

12 Claims, No Drawings

COATING COMPOSITIONS COMPRISING A BLEND OF AN ETHYLENE VINYL ACETATE POLYMER WITH A FATTY ACID AND EMULSIONS

This invention is concerned with coating compositions for waterproofing, glues, paints, and anti corrosion treatments for metals, and in particular with such compositions containing polyethylene vinyl acetate (EVA) and metal complexes or nitrogen based cations (ammonia, amines and quaternary salts).

WATERPROOFING FORMULATIONS

Cationic oil-in-water and water-in-oil emulsions employing a polyvalent metal (e.g. Cr, Ti, Al, Zr, Sn) with a fatty acid and a paraffinic wax component, are commonly used as waterproofing preparations. (For these purposes oxidised waxes can be considered to be fatty acids with very long hydrocarbon chains, blended with paraffinic wax.)

Also wax based anionic preparations can be prepared which are subsequently deposited on substrates by ion exchange with soluble salts of dibasic or polybasic metals. The anionic component may be applied before or after the polybasic metal salt component.

Additionally solutions of waxes containing reactive metal complexes are used in order to impart water-repellency, especially in the dry-cleaning trade. The metals employed belong to the group listed above for use in water-based formulations.

Polybasic metals are generally used in the application of water-repellency because of their ability to attach themselves to sites on the textile or leather to which they are applied. Thus the metal forms a bridge between the substrate and the hydrophobic component, commonly a negative organic ion, of the water-repellent preparation.

Initial water-repellency achieved using systems of the type described can be very good. Unfortunately durability is in general poor, because the adhesion of the hydrophobic component to the substrate is not maintained in conditions of flex and abrasion.

Another route to the breakdown of these water-repellent systems is wetting itself. Wetting leads to the swelling of most fibres, and in that case the fibre stretches away from the hydrophobic coating. Therefore water-resistance and water-repellency are reduced every time the fabric is wetted, leading to rapid breakdown in practical field conditions.

Metal soap or wax plus metal soap formulations have traditionally found their applications on natural fibres and natural fibre mixes in the textile industry. Applications to coarser synthetic fibres like polyamides have not been found to be very successful for reasons of appearance and poor adhesion. Applications above a very low level indeed lead to crazing and chalking on these fabrics.

The durability of these waterproofing preparations in conditions of flex and abrasion would be greatly enhanced if a level of elasticity could be incorporated into the final coating. Elasticity would allow the coating to be resilient to flex and abrasion, and to the stretch which occurs during wetting.

This invention described a means to incorporate elasticity into water-repellent preparations based on metal complexes by incorporating EVA into the system.

ADHESIVE FORMULATIONS

Common solvent based adhesives incorporate a blend of EVA, a tackifier resin, and high solvency solvents such as aromatic hydrocarbons, chlorinated hydrocarbons, alcohols or glycols or cellosolve variants. All of these solvents are both expensive and pose significant health hazards.

This invention describes a means by which an effective glue can be formulated using EVA, innocuous low aromatic mineral spirits, tackifier resin, and a metal complex. The formulation can be prepared as an oil-in-water emulsion, water-in-oil emulsion, or as a purely solvent based formulation.

ANTI-CORROSION PREPARATIONS FOR METALS

Oxidation of metals is an ubiquitous problem.

This invention describes a means to bond a continuous film of a compounds of EVA to a metal surface, thus providing an elastic, waterproof and resilient protection onto which subsequent paint coatings can be applied. The metal incorporated in the formulation will be either the metal itself or a combination of another metal and the metal itself.

PAINTS

This invention describes a means to provide a binder for water-resistant aqueous emulsion paints which incorporate EVA, a coalescing solvent (preferably aliphatic hydrocarbon), and a metal complex.

POLYETHYLENE VINYL ACETATE

Polythylene vinyl acetate (EVA) is a synthetic co-polymer of ethylene and vinyl acetate which is inherently elastic. It is available in different grades according to molecular weight and the relative percentage of vinyl acetate (VAc) and ethylene components.

The grades of EVA which are most compatible with mineral waxes are those which have a vinyl acetate content which is less than or equal to 28 per cent. These grades are not compatible at room temperature (25° C.) with aliphatic hydrocarbon oil (e.g. technical white oil) or mineral spirits and have limited solubility in other solvents, e.g. aromatic hydrocarbons, alcohols, chlorocarbons). Grades of EVA with a vinyl acetate content of 33 percent or more are much more compatible with solvents, but are not compatible with mineral waxes at temperatures below 65° C. 40 percent vinyl acetate content EVA for example, is much more soluble in organic solvents than 28 percent Vac EVA, but still gels an aliphatic hydrocarbon solvent at 25° C. at levels greater than 35 percent EVA/solvent.

Incorporation of solvent into any system employing EVA is desirable:
1. To facilitate emulsification.
2. To act as a coalescing agent in emulsion based systems.
3. To act as a carrier for the EVA in solvent based systems.

SUMMARY OF THE INVENTION

The present invention is based on the discovery that the compatibility of all grades of EVA with solvents (especially with aliphatic hydrocarbon solvents), hydrocarbon oils, and mineral waxes is greatly improved by blending the EVA with a fatty acid and heating the mixture at or above the melting point of the EVA.

Furthermore the resultant blends are much more easily emulsified in the presence of cations than blends which have not been processed with the fatty acids.

Accordingly, one aspect this invention provides a composition comprising a blend of an EVA polymer and a fatty acid, formed by heating the EVA and fatty acid in admixture at or above the melting point of the EVA.

Typically the starting material for the improved product of this invention is a composition comprising a blend of an EVA polymer and a fatty acid which is miscible in all proportions with mineral spirits at 25° C. or forms a solution at a level 5% of fatty acid in mineral spirits.

As indicated above, to achieve the effects desired by further aspects of the invention the EVA and fatty acid are heated together at a temperature at or above the melting point of the EVA and blended until a homogenous mixture has been obtained.

In a further aspect of the invention the EVA/fatty acid blend is then blended with either wax or solvents in different combinations. The same advantages will be gained if the fatty acid is first dissolved in either solvent or wax or both before blending with the EVA at a temperature at or above the melting point of the EVA.

In a further aspect of the invention a metal complex is incorporated into the blend, for example in the form of aqueous metal ions or a reactive organic metal compound.

The accompanying TABLE outlines the advantages gained by heating a typical suitable fatty acid, coconut fatty acid, with different grades of EVA, and then blending with various waxes and solvents.

The individual components of the invention will now be described in more detail:

EVA GRADES

The preferred grade of EVA for inclusion in the formulation has a 40 percent VAc content. Such grades are commercially available, for example from Dupont under the trade name Elvax 40. Equivalent materials are available from other sources.

This grade is especially suitable because of its relatively low melting point, high stretch before break, and its compatibility with solvents. The grade softens in contact with white spirit (mineral spirits) and dissolves at around 60° C. On cooling it remains in solution, but gels at 25° C. at concentrations greater than 35 percent EVA to white spirit. Normally it is incompatible with waxes below 117° C.

Other grades may be selected where there properties are desirable for specific applications.

FATTY ACIDS

Suitable carboxylic acids for use in this invention include:

Saturated fatty acids containing up to 16, preferably 8-16 carbon atoms e.g. coconut fatty acids, palm fatty acids, mystyric acid.

Unsaturated fatty acids containing more than 20 carbon atoms but remaining compatible with mineral spirits at all proportions at 25° C., or forming a 5 percent clear solution at 25° C., e.g. oleic acid, ricinoleic acid.

Modified fatty acids as above which may contain another functional group (e.g. peptide, amine) but remain miscible in all proportions with mineral oil or white spirit at 25° C., e.g. oleyl sarcosinic acid.

Other suitable acids can be ascertained by the simple procedure of testing for miscibility/solubility with mineral spirits, as described above.

MINERAL WAXES

The preferred grades of mineral wax to be used are paraffin waxes with a melting point below 50° C. This wax has been chosen for its relatively low melting point and high solubility in mineral spirits.

METAL COMPOUNDS

Suitable compounds are soluble metal salts of polyvalent metals. The preferred metal salts are those which have a volatile anion, e.g. acetates. Also there may be used reactive organic compounds of polyvalent metals which are soluble in solvents. Typical compounds are alkoxy derivatives of polyvalent metals.

Preferred metals are Zr, Ti, Cr, Sn, Al because of the usual lack of strong colour in their compounds. However any metal with a valency greater than one could be considered.

SOLVENTS

The preferred solvents are low aromatic content hydrocarbon solvents because of their low cost, and low toxicity. Otherwise any solvent with the appropriate miscibility/solubility for an intended application can be used.

OPTIONAL ADDITIVES

Mineral oil (technical white oil) may be added to the formulation to depress the melting point of the mixture. Ester gums may be added to improve clarity and adhesive quality. Other commercial tackifier resins may be added for adhesive formulations. Drying oils might be added for paint formulations. Surface active agents (e.g. silcone or fluorocarbon) may be added to improve coalescence on deposition).

PROCEDURE

Improved solubility of the selected EVA grade in both commercial solvents and mineral waxes can be achieved by blending it at 90° C. or high with a fatty acid which is miscible in all proportions with white spirit or mineral oil at 25° C. or forms a 5 percent solution at 25° C. in mineral spirits.

Even an addition of 1 percent of a fatty acid as defined above to an EVA grade with a 40 per VAc content will improve its solubility in mineral oils and waxes (and other commercial solvents).

However, to assure maximum solubility, and also subsequent ease of emulsion, levels of 15 percent or greater of fatty acid to EVA will probably be chosen. At levels of greater than 90 percent fatty acid to EVA the advantage gained from the incorporation of EVA becomes minimal.

The invention is further illustrated in the following examples.

EXAMPLE 1

EVA and Fatty Acid alone

The following combination of EVA (40 VAc) and coconut fatty acids was found to dissolve easily in white spirit at room temperature (20° C.).

| 40 VAc EVA | Coconut Fatty Acid |
| --- | --- |
| 100 | 15 |

The components were heated together at 110° C. for 1 hour and gently blended.

A 33 percent solution of the above formulation in white spirit did not gel at room temperature, but formed a highly viscous, spreadable solution.

EXAMPLE 2

EVA, Fatty Acid and Paraffin Wax

The following formulation of 40 VAc EVA, 46°–99° C. MP Paraffin wax and Coconut fatty acid was melted together. The wax was melted first, then the coconut fatty acid was added, and then the EVA was added.

| Paraffin Wax (46–99) | Coconut Fatty Acid | EVA |
| --- | --- | --- |
| 200 | 30 | 100 |

The mixture was heated together at 100° C. and gently blended for 1 hour.

The resultant product solidified on cooling to a white, totally homogeneous solid with resilient properties.

This solid was soluble in white spirit, and formed a clear solution at 40° C.

EXAMPLE 3

Combinations with metals (a) Solutions:

The 33 per cent EVA/Fatty Acid: White spirit formulation discussed above can be further diluted 1:2 with white spirit to arrive at a 10 per cent solution. Tetranonyl titanate is added to the solution in the proportion, Solution: Titanate of 100:5 at room temperatures.

The resultant solution will remain stable for a least 8 hours and can be padded or spread on to a textile substrate. In due course the titanium component crosslinks the vinyl acetate and fatty acid component, and solubility is reduced.

The solution durably reduced the water-uptake of cotton fabric, hence speeding up drying times. It can be applied to finely woven polyamide to reduce pore size and also negate water-absorbency.

A more concentrated solution can be spread on to a fabric to form a continuous film on drying. High vinyl acetate content EVA permits a level of moisture transmission through it, so this a novel route to a low cost "breathable" fabric or leather coating.

Titanium complexes can equally be added to Wax/EVA, Fatty acid formulations as mentioned above to produce a less washfast, but more water-repellent finish.

(b) Water in oil Emulsions:

A 15 per cent solids solution of EVA and Fatty Acid in Hydrocarbon solvent will form a water-in-oil emulsion if Acidic Zirconium Acetate solution is stirred into it at high speed.

The following formulation produces a smooth, white cream:

| 40 VAc EVA | Coco Fatty Acid | White Spirit | Zr (Ac)$_4$ |
| --- | --- | --- | --- |
| 100 | 15 | 600 | 60 |

This emulsion dries to an elastic, tough film which adheres well to fabrics.

The equivalent emulsions made up containing paraffin wax can be applied at lower solvent concentration in order to achieve a more water-repellent coating.

Unlike the titanium solution, this emulsion does not develop solvent resistance. However, it does remain stable indefinitely, and therefore can be used as the basis for one pack seam sealing or glue formulations which do not contain noxious solvents and are water-resistant.

(c) Cationic oil-in-water emulsions:

These can be achieved by high speed emulsification of the EVA/Fatty Acid/Solvent combination in a excess of acidified Zirconium Acetate solution. A typical formulation is:

| OIL COMPONENT (EVA ETC.) | Zr (Ac)$_4$ | 80% HAc | H$_2$O |
| --- | --- | --- | --- |
| 200 | 100 | 100 | 200 |

The above emulsion can be diluted with deionised water and applied directly to textiles, leather and other surfaces.

(d) Anionic Emulsions deposited via ion exchange:

Either of the two oil component types discussed above can be emulsified by energetic mixing in a basic solution (e.g. KOH, NaOH, NH$_4$OH, an amine or a quaternary).

Passing fabric or leather first through diluted anionic emulsion and then into a solution of a metal salt (e.g. Zr, Al, Sn, Ti, etc) leads to ion exchange and deposition of the oil component. Deposition can also be achieved by passing the fabric through the metal salt first, drying, and then passing into the diluted anionic emulsion. This approach would not be favoured due to difficulties in obtaining a even coating and increased processing time.

An anionic emulsion made up with volatile anion might be applied directly to a metal surface, e.g. steel or aluminium, causing deposition by solution of the metal surface.

The present invention may also make use of the discovery that the addition of a salt of an amine acetic acid in sufficient quantity to an acidified salt of zirconium has two highly beneficial effects with respect to subsequent emulsification of oily materials in the system.

Cationic emulsions with Zirconium

Cationic emulsions comprised of acidic zirconium acetate or the acidic zirconium salt of a volatile weak acid, and a polar organic chain (e.g. a fatty acid or oxidised wax) have found uses in the application of water-repellent materials to textiles and other substrates. Commonly the system described would be used to further emulsify an oil based material, e.g. paraffin wax.

In a typical formulation a fatty acid (e.g. stearic acid) is melted together with a low melting point paraffin wax. The molten blend is then added progressively to a solution of zirconium acetate and acetic acid with vigorous stirring. A cationic oil-in-water emulsion is formed which remains stable in the presence of excess acetic acid. On cooling below the melting point of the wax component the mixture can be considered to be a dispersion.

Raising the pH to pH 6.5 to 7 or above destabilises the emulsion leading to the deposition of the oily component on any available substrate, or a transition to a water-in-oil emulsion from an oil-in-water emulsion.

The emulsion is also destabilised by raising the temperature to 50° C. or above.

Thus the emulsion can be broken by:
A. Copious dilution with water, or
B. Addition of an alkali, or
C. Evaporation of the acetic acid component, or
D. Raising the temperature above 50° C., or any combination of these four possibilities.

The sensitivity of these mixtures to pH has been used for applications to textiles and other substrates. An acidified, diluted zirconium/wax emulsion is padded onto a textile and then dried. On drying, the acetic acid evaporates, leaving an insoluble coating on the textile fibre.

An additional advantage is gained from the usage of zirconium, for the metal is particularly reactive with basic groups on proteins and hydroxyl groups on cellulose. Therefore on deposition the metal attaches itself to fibres, aligning hydrophobic groups in a direction away from the fibres. Hence water-repellency is not only enhanced, but also made more durable than a simple wax coating.

A disadvantage of the system is that the emulsion breaks on dilution unless excess acetic acid is added to maintain a low pH. Furthermore, the diluted emulsion, even including excess acetic acid is sensitive to the presence of calcium or iron ions and may break at an inconvenient moment with dilution with hard water.

As mentioned above it has been found that the addition of a salt of an amine acetic acid in sufficient quantity to an acidified salt of zirconium has two highly beneficial effects with respect to subsequent emulsification of oily materials in the system.

For the purposes of this patent an amine acetic acid can be described as having the following structure:

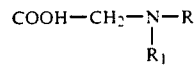

where R or R1 may be further acetic acid groups, carbon chains linking to further amine acetic acid groups, or alcohol groups.

Although a whole range of chemicals having the above general description have the beneficial effects described below, ethylene diamine tetra acetic acid (EDTA) is a particularly convenient additive due to its wide commercial availability.

This aspect of the invention is based upon the discovery that:
1. EDTA complexes with the acidified zirconium salt of a weak acid in such a fashion that the resultant mixture has a strong emulsifying and detergency effect.
2. Having emulsified an oil component with a Zr/EDTA complex, the resultant emulsion is much more stable to variations of pH, temperature and the presence of calcium ions than an identical emulsion without the presence of EDTA.

The emulsifying power of the Zr/EDTA complex can be demonstrated by the following experiment.

Two solutions are prepared, solution A and solution B.

Solution A is comprised of 100 grams of commercial zirconium acetate solution (22 per cent $ZrO_2$ and 17-24 per cent HAc) plus 100 grams of 80 per cent acetic acid plus 300 grams of distilled water.

Solution B is prepared by dissolving 3 grams of 0.880 ammonium hydroxide with 6 grams of EDTA acid in 300 grams of distilled water, and then mixing this into a mixture of 100 grams of $ZrAc_4$ solution as above and 100 grams of 80% acetic acid.

500 grams of technical white oil (aliphatic hydrocarbon oil) is added to solution A in a laboratory mixer at 20° C., and the resultant mixture is left to stand. It is evident that the white oil quickly begins to separate from the aqueous phase. A minimal amount of white oil remains emulsified in the aqueous phase, sufficient to make the phase slightly turbid whilst remaining translucent. Similarly a minimal amount of aqueous solution remains emulsified in the oil component, making it slightly turbid, but still translucent.

500 grams of technical white oil are added to solution B in the same conditions. The resultant oil in water emulsion is white, creamy, and stable. The emulsion can be further diluted 500 per cent with tap-water without separation of the two phases.

Therefore the EVA-containing compositions of the invention are preferably formed into emulsions and dispersions using the above described Zirconium/amine acetic acid system.

The emulsifying system may be prepared, for example, by dissolving 3 parts by weight (pbw) of 0.880 Ammonium Hydroxide with 6 pbw of EDTA acid in 300 pbw of distilled water, and then mixing this into a mixture of 100 pbw of $Zr(Ac)_4$ solution (22 per cent $ZrO_2$ and 17-24 per cent HAc) and 100 pbw of 80% acetic acid. Incorporating, for example, 500 pbw of EVA-containing component into the Zr-containing solution results in a stable emulsion.

In fact the stability achieved by the presence of EDTA in conditions of high pH is temporary. As alkalinity increases, gradually the EDTA/Zirconium complex reverts to an insoluble zirconium compound (zirconium oxide, or a combination with the fatty acid with which it was originally solubilised.

In practice, the temporary stability achieved by the incorporation of EDTA enables applications for cationic zirconium emulsions which would otherwise be impossible.

An important example is the application of a Zirconium EVA/wax in a washing machine.

If 100 grams of Zirconium EVA/wax emulsion which contains no EDTA is introduced to wet clothing in a washing machine and machine cycle is run, then the penetration of the EVA/wax on the cloth is extremely uneven. The failure to penetrate arises because the emulsion breaks before it has time to penetrate the fabric. However, an equivalent emulsion prepared using EDTA in the initial emulsification of the wax remains fully emulsified long enough to penetrate the fabric and gradually deposits itself on to the fibres, so that by the end of the washing machine cycle the water in the washing machine has cleared and all of the emulsion has been deposited.

Use of higher temperature washes exacerbates the failure to penetrate experienced with zirconium wax which has not been prepared with EDTA, whereas applications over the full range of temperature is possible with the EDTA/Zr emulsions.

SUITABLE AMINE ACETIC ACIDS

Suitable structures for the amine acetic acid defined above include the following. EDTA is preferred:

A. COOH—CH$_2$—N—CH$_2$—COOH
                |
                CH$_2$—COOH (nitrilo tri acetic acid)

B. COOH—CH$_2$—N—CH$_2$—OH
               |
               CH$_2$OH (N,N-Di (Hydroxy ethyl) glycine C. COOH—CH$_2$—N—CH$_2$—COOH
                |
                CH$_2$
                |
                CH$_2$
                |
COOH—CH$_2$—N—CH$_2$—COOH (Ethylene diamine tetracetic acid - EDTA)

D. COOH—CH$_2$—N—CH$_2$—COOH
                |
                (CH$_2$)$_2$
                |
                N—CH$_2$—COOH
                |
                (CH$_2$)$_2$
                |
COOH—CH$_2$—N—CH$_2$—COOH (Diethylene triamine penta-acetic acid - DTPA)

E. COOH—CH$_2$—N—CH$_2$—COOH
               |
               CH$_2$
               |
               CH$_2$
               |
               CH$_2$
               |
COOH—CH$_2$—N—CH$_2$—COOH (Propylene diamine tetracetic acid - PTDA)

BASE FOR SOLUTION OF AMINE ACETIC ACID

The preferred base for the solution of EDTA or other acids is ammonium hydroxide, because of its volatility. However, sodium or potassium or any other momovalent base will function adequately.

PREFERRED SALT OF AMINE ACETIC ACID

The preferred salt is the soluble salt which contains least base and is therefore most acidic, purely for reasons of economy in the acidification of the mixture. The preferred sodium salt of EDTA, for example, is the monosodium salt.

ACID FOR ACIDIFICATION

The preferred acid is acetic acid, although any weak acid which has a soluble salt with zirconium would be satisfactory. Strong acids tend to inhibit the complexing of the amine acetic acid with the zirconium.

PREFERRED ZIRCONIUM SALT

The preferred zirconium salt is zirconium acetate.

USE LEVELS

Even a tiny amount of EDTA salt added to an acid solution of zirconium acetate will reduce surface tension, and increase stability of a subsequent emulsion formed with it. However, in practice a minimum of 0.5 grams of EDTA acid to 100 grams of 23 per cent ZrO$_2$ content zirconium acetate is recommended. pH should be maintained at a maximum of 5 with acetic acid to ensure the stability of emulsions over time.

The maximum amount of EDTA added would normally correspond to one molecule of EDTA for every molecule of ZrAc$_4$, although the limit will be set by solubility. As the percentage presence of amine acetic acid increases towards molar parity with the zirconium, detergency reduces.

PROCEDURE

EXAMPLE 4

Preparation of a Cationic Zirconium Wax emulsion 100 grams of zirconium acetate solution (22 per cent ZrO$_2$) and 100 grams of 80% acetic acid are mixed together.

8 grams of EDTA acid and 4 grams of 0.880 ammonium hydroxide are dissolved together in 400 grams of distilled water.

The EDTA solution is added with stirring to the zirconium acetate/acetic acid mixture.

The temperature of the resultant mix is raised to 40° C.

200 grams of 46°/49° C. melting point paraffin wax is melted together with 20 grams of stearic acid and raised to 70° C.

The molten wax mixture is introduced gradually into the Zr/HAc/NH$_4$OH/H$_2$O in a high speed mixer.

The resultant emulsion is cooled whilst stirring until it reaches 25° C.

EXAMPLE 5

Preparation of Cationic emulsions of oil-soluble materials

A cationic emulsion of any oil-soluble material can be obtained by substituting the material for the paraffin wax in the Example 4. Materials which can be emulsified in this fashion include oleoresinous varnishes, drying oils, polymer solutions, tackifying resins and oil soluble dyes. If the melting point of the material is greater than or approximately equal to 100° C., then it will be advisable to dilute it first with suitable solvent.

| COMPARATIVE TABLE OF COMPATIBILITY OF EVA GRADES WITH SOLVENTS AND WAXES WITH AND WITHOUT 15 PERCENT COCO FATTY ACID | | | |
|---|---|---|---|
| CHEMICAL COMBINATION WITH EVA | WITHOUT COCO FATTY ACID | WITH COCONUT FATTY ACID AT 15% W/W OF EVA | COMBINATIONS WITH METALS ENABLED THROUGH ACID ADDITION |
| EVA + ALIPHATIC SOLVENT | | | |
| HIGH Vinyl Acetate content EVA + Aliphatic Hydrocarbon Solvent (Mineral Spirits or Odourless Kero- | 8 percent soluble in Mineral Spirits at 25° C. Solutions prepared at higher temperatures remain stable | A 50% solution can be obtained at 25° C. The EVA/Fatty Acid blend is miscible in all | High Solids content Cationic Oil in water emulsions with Zirconium which will coalesce on a substrate at 25° C. |

-continued

| CHEMICAL COMBINATION WITH EVA | WITHOUT COCO FATTY ACID | WITH COCONUT FATTY ACID AT 15% W/W OF EVA | COMBINATIONS WITH METALS ENABLED THROUGH ACID ADDITION |
|---|---|---|---|
| sene) (40% Vinyl Acetate content - Dupont Elvax 40) | for 16 hours (up to a maximum 35% EVA/Mineral Spirits ratio) at 25° C. Stronger concentrations gel and cloud. | proportions with Mineral Sprirts at 25° C., without cloud point. | Many potential applications - from metal treatments to textile or leather finishes. Water in oil emulsions with Zirconium which can function as glues, paints or leather or textile coatings. |
| EVA + ALIPHATIC SOLVENT LOW Vinyl Acetate content EVA + Alphatic Hydrocarbon solvent (Mineral Spirits or Odourless kerosene) (28% Vinyl Acetate content - Dupont Elvax 210) | This grade of EVA is not soluble or miscible with mineral spirits at 25° C. | A 50% solution can be obtained at 25° C. The EVA/Fatty Acid blend is miscible in all proportions with Mineral Spirits at 25° C. | Solvent based solutions containing Titanium in the form of Titanates, which can function as glues, paint or leather or textiles coatings. Anionic emulsions with bases for deposition with salts of polyvalent metals. |
| EVA + PARAFIN WAX HIGH Vinyl Acid content EVA plus paraffin Wax (46/49° C. melting point). (40% Vinyl Acetate content EVA - Dupont Elvax 40) | NOT compatible below 117° C. (Cloud point is 117° for a 50% EVA/Wax mix. | Compatible in all proportions Cloud point is just a few degrees above solidification point in all proportions. | Oil in water Cationic dispersions with Zirconium which can be applied to textiles or leather, requiring a heat curing process to coalesce on substrate. Primary use of this product would be industrial application to textiles, to achieve durable, elastic water-repellency. |
| EVA + PARAFFIN WAX LOW Vinyl Acetate content EVA + Paraffin Wax (46-49° C. MP) (28% Vinyl Acetate content - Dupont Elvax 210) | Compatible in all proportions. Cloud point is a few degrees above solidification point in all proportions. | Compatible in all proportions. Cloud point is just a few degrees above solidification point in all proportions. Viscocity is significantly reduced just above melting point in the blend containing fatty acid. | Anionic emulsions with bases for deposition with salts of polyvalent metals. |
| EVA + PARAFFIN WAX + ALIPHATIC HYDROCARBON SOLVENT HIGH Vinyl Acetate content EVA + Paraffin Wax + Aliphatic Hydrocarbon Solvent (40% Vinyl Acetate content EVA - Dupont Elvax 40) | Only compatible at temperatures greater than 60° C. EVA seperates at 25° C. in all proportions of the three components. | Fully miscible in all proportions at 25°. | High Solids content Cationic Oil in water emulsions with Zirconium which will coalesce on a substrate at 25° C. Applications relate to imparting durable water-repellency to textiles or leather by immersion or by painting on to a surface. Water in oil emulsions with Zirconium for waterproofing. |
| EVA + PARAFFIN WAX + ALIPHATIC HYDROCARBON SOLVENT LOW Vinyl Acetate content EVA + Paraffin Wax + Aliphatic Hydrocarbon Solvent (28% Vinyl Acetate content EVA-Dupont Elvax 210) | Compatible at temperatures greater than 60° C. EVA seperates at 25° C. in all proportions | Fully miscible in all proportions at 25° C. | Solvent based solutions containing Titanium in the form of Titanates, to impart water-repellency to textiles, leather and masonry. Anionic emulsions with bases for deposition with polyvalent metals. |

I claim:

1. A coating composition comprising a blend of a modified ethylene-vinyl acetate polymer with at least one member selected from the group consisting of a hydrocarbon oil, a hydrocarbon solvent and a mineral wax, said modified polymer having been obtained by heating together ethylene-vinyl acetate polymer with a fatty acid at a temperature at or above the melting point of the polymer, said fatty acid being a fatty acid which is miscible in all proportions with mineral spirits at 25° C. or which forms a solution at 5% in mineral spirits.

2. A composition according to claim 1 in which the fatty acid is a saturated fatty acid or an unsaturated fatty acid or a mixture of fatty acids containing such acids, or a fatty acid modified by incorporation of another functional group.

3. A composition according to claim 1 wherein said blend is dispersed in a solvent selected from the group consisting of low aromatic and aliphatic hydrocarbon solvents.

4. A composition according to claim 1 including a mineral wax blended therewith.

5. A composition according to claim 1 incorporating a metal complex.

6. A composition according to claim 5 in which the metal complex is produced by incorporating salts or organo metallic compounds of polyvalent metals.

7. A composition according to claim 1 wherein said blend is emulsified in an aqueous carrier.

8. A composition according to claim 7 in which the emulsion is formed by adding to the composition as emulsifying agent an acidified salt of zirconium with an amine acetic acid of formula

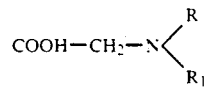

where R and $R_1$ are independently further acetic acid groups, carbon chains linked to further amine acetic acid groups, or alcohol groups.

9. A composition according to claim 8 in which the pg.31 emulsifying system comprises zirconium acetate and EDTA.

10. A process for the preparation of a composition as claimed in 1 which comprises mixing an ethylene vinyl acetate polymer and a fatty acid, heating the mixture at or above the melting point of the polymer, and blending the mixture with a hydrocarbon solvent and/or mineral wax, and/or adding a metal complex and adding an emulsifying agent and forming an aqueous emulsion.

11. A coated substrate wherein the substrate is coated with a composition prepared by the process of claim 10.

12. A coated substrate according to claim 11 wherein the substrate is a textile or fibrous material.

* * * * *